(12) United States Patent
Sridhara et al.

(10) Patent No.: US 8,477,801 B2
(45) Date of Patent: Jul. 2, 2013

(54) BACKOFF PROCEDURE FOR POST DOWNLINK SDMA OPERATION

(75) Inventors: Vinay Sridhara, Santa Clara, CA (US); Josephine Pui Kwan Chu, San Diego, CA (US); Santosh P. Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 725 days.

(21) Appl. No.: 12/638,727

(22) Filed: Dec. 15, 2009

(65) Prior Publication Data
US 2011/0141969 A1 Jun. 16, 2011

(51) Int. Cl.
*H04L 12/413* (2006.01)
*H04W 74/08* (2009.01)

(52) U.S. Cl.
USPC .......................................................... 370/448

(58) Field of Classification Search
None
See application file for complete search history.

(56) References Cited

U.S. PATENT DOCUMENTS

| 7,206,319 | B2* | 4/2007 | Li et al. ........................... 370/448 |
| 7,280,554 | B2* | 10/2007 | Moutarlier ..................... 370/445 |
| 2003/0053480 | A1 | 3/2003 | Jang et al. |
| 2003/0145095 | A1* | 7/2003 | Liu et al. ........................ 709/230 |
| 2007/0195813 | A1* | 8/2007 | Lin ................................. 370/448 |
| 2008/0182609 | A1* | 7/2008 | Somasundaram et al. .... 455/522 |
| 2008/0279210 | A1* | 11/2008 | Naka et al. ..................... 370/448 |
| 2009/0196273 | A1* | 8/2009 | Kwon et al. ................... 370/343 |
| 2009/0238163 | A1* | 9/2009 | Zhang et al. .................. 370/338 |
| 2010/0135264 | A1* | 6/2010 | Nilsson ......................... 370/338 |
| 2012/0120796 | A1* | 5/2012 | Chu et al. ...................... 370/230 |

FOREIGN PATENT DOCUMENTS

WO WO2009002296 A1 12/2008

OTHER PUBLICATIONS

International Search Report and Written Opinion—PCT/US2010/060611—ISA/EPO—Apr. 12, 2011.
Siwaruk Siwamogsatham, et al., "A Novel Smart-DCF Scheme for High-Speed WLANs", Communications and Information Technologies, 2007. ISCIT '07, International Symposium on, IEEE, P1, Oct. 1, 2007, pp. 1032-1037, XP031166613.
Thangaraj A, et al., "Performance Analysis of the IEEE 802.11e Wireless Networks With TCP ACK Prioritization", Computer Communications and Networks, 2008. ICCCN '08. Proceedings of 17th International Conference on, IEEE, Piscataway, NJ, USA, Aug. 3, 2008, pp. 1-6, XP031362252, ISBN: 979-1-4244-2389-7.
Zhou S. et al., "An Uplink Medium Access Protocol with SDMA Support for Multiple-Antenna WLANs" Wireless Communications and Networking Conference, 2008. WCNC 2008. IEEE, IEEE, Piscataway, NJ, USA, Mar. 31, 2008, pp. 1809-1814, XP031243907.

* cited by examiner

*Primary Examiner* — Min Jung
(74) *Attorney, Agent, or Firm* — Steven R. Thiel (57) ABSTRACT

Certain aspects of the present disclosure relate to a technique for decreasing a probability of post-backoff collisions that occur during uplink transmissions from multiple user stations (STAs) following completion of downlink transmission from an access point to the STAs.

83 Claims, 9 Drawing Sheets

BACKOFF PROCEDURE FOR POST DOWNLINK SDMA OPERATION

BACKGROUND

1. Field

Certain aspects of the present disclosure generally relate to wireless communications and, more particularly, to backoff procedure applied at user stations following completion of simultaneous downlink transmissions.

2. Background

According to the Transmission Control Protocol (TCP), after completion of downlink transmissions to a plurality of user stations (STAs) using either Spatial Division Multiple Access (SDMA) or Time Division Multiple Access (TDMA) scheme, the STAs are generally required to send TCP acknowledgements on uplinks. However, if each STA chooses individually its own back-off count and begins post-backoff immediately after the block acknowledgement, then it is highly likely that post-backoff collisions can occur.

Methods are proposed in the present disclosure to address the problem of post-backoff collisions that occur during uplink transmissions from multiple user STAs that simultaneously received downlink transactions.

SUMMARY

Certain aspects provide a method for wireless communications. The method generally includes determining a backoff value for each of a plurality of apparatuses to receive simultaneous transmissions, wherein the backoff values are determined, at least in part, based on a number of the apparatuses and wherein the backoff values indicate how long the apparatuses should wait after receiving the simultaneous transmissions before transmitting, and transmitting the determined backoff values to the apparatuses.

Certain aspects provide an apparatus for wireless communications. The apparatus generally includes a processing system configured to determine a backoff value for each of a plurality of apparatuses to receive simultaneous transmissions, wherein the backoff values are determined, at least in part, based on a number of the apparatuses and wherein the backoff values indicate how long the apparatuses should wait after receiving the simultaneous transmissions before transmitting, and a transmitter configured to transmit the determined backoff values to the apparatuses.

Certain aspects provide an apparatus for wireless communications. The apparatus generally includes means for determining a backoff value for each of a plurality of apparatuses to receive simultaneous transmissions, wherein the backoff values are determined, at least in part, based on a number of the apparatuses and wherein the backoff values indicate how long the apparatuses should wait after receiving the simultaneous transmissions before transmitting, and means for transmitting the determined backoff values to the apparatuses.

Certain aspects provide a computer-program product for wireless communications. The computer-program product includes a computer-readable medium comprising instructions executable to determine a backoff value for each of a plurality of apparatuses to receive simultaneous transmissions, wherein the backoff values are determined, at least in part, based on a number of the apparatuses and wherein the backoff values indicate how long the apparatuses should wait after receiving the simultaneous transmissions before transmitting, and transmit the determined backoff values to the apparatuses.

Certain aspects provide an access point. The access point generally includes at least one antenna, a processing system configured to determine a backoff value for each of a plurality of wireless nodes to receive simultaneous transmissions, wherein the backoff values are determined, at least in part, based on a number of the wireless nodes and wherein the backoff values indicate how long the wireless nodes should wait after receiving the simultaneous transmissions before transmitting, and a transmitter configured to transmit via the at least one antenna the determined backoff values to the wireless nodes.

Certain aspects provide a method for wireless communications. The method generally includes receiving, at an apparatus of a plurality of apparatuses, a message transmitted from another apparatus to the apparatuses, the message comprising backoff values, wherein each backoff value is assigned to one of the apparatuses, and refraining from transmitting for a time period indicated by the backoff value assigned to the apparatus.

Certain aspects provide an apparatus for wireless communications. The apparatus generally includes a receiver configured to receive, at the apparatus of a plurality of apparatuses, a message transmitted from another apparatus to the apparatuses, the message comprising backoff values, wherein each backoff value is assigned to one of the apparatuses, and a transmitter configured to refrain from transmitting for a time period indicated by the backoff value assigned to the apparatus.

Certain aspects provide an apparatus for wireless communications. The apparatus generally includes means for receiving, at the apparatus of a plurality of apparatuses, a message transmitted from another apparatus to the apparatuses, the message comprising backoff values, wherein each backoff value is assigned to one of the apparatuses, and means for refraining from transmitting for a time period indicated by the backoff value assigned to the apparatus.

Certain aspects provide a computer-program product for wireless communications. The computer-program product includes a computer-readable medium comprising instructions executable to receive, at an apparatus of a plurality of apparatuses, a message transmitted from another apparatus to the apparatuses, the message comprising backoff values, wherein each backoff value is assigned to one of the apparatuses, and refrain from transmitting for a time period indicated by the backoff value assigned to the apparatus.

Certain aspects provide a wireless node. The wireless node generally includes at least one antenna, a receiver configured to receive via the at least one antenna, at the wireless node of a plurality of wireless nodes, a message transmitted from an access point to the wireless nodes, the message comprising backoff values, wherein each backoff value is assigned to one of the wireless nodes, and a transmitter configured to refrain from transmitting for a time period indicated by the backoff value assigned to the wireless node.

Certain aspects provide a method for wireless communications. The method generally includes transmitting a control message to each of a plurality of apparatuses to receive simultaneous transmissions, receiving an acknowledgement message from each of the apparatuses, wherein the acknowledgement messages were transmitted after receiving the control message at the apparatuses, and in response to the acknowledgement messages, transmitting, to the apparatuses, a back-off timing message with backoff values, wherein the backoff values indicate how long the apparatuses should wait after receiving the simultaneous transmissions before transmitting.

Certain aspects provide an apparatus for wireless communications. The apparatus generally includes a transmitter configured to transmit a control message to each of a plurality of apparatuses to receive simultaneous transmissions, and a receiver configured to receive an acknowledgement message from each of the apparatuses, wherein the acknowledgement messages were transmitted after receiving the control message at the apparatuses, wherein the transmitter is also configured to transmit, to the apparatuses in response to the acknowledgement messages, a backoff timing message with backoff values, wherein the backoff values indicate how long the apparatuses should wait after receiving the simultaneous transmissions before transmitting.

Certain aspects provide an apparatus for wireless communications. The apparatus generally includes means for transmitting a control message to each of a plurality of apparatuses to receive simultaneous transmissions, and means for receiving an acknowledgement message from each of the apparatuses, wherein the acknowledgement messages were transmitted after receiving the control message at the apparatuses, wherein the means for transmitting is further configured to transmit, to the apparatuses in response to the acknowledgement messages, a backoff timing message with backoff values, wherein the backoff values indicate how long the apparatuses should wait after receiving the simultaneous transmissions before transmitting.

Certain aspects provide a computer-program product for wireless communications. The computer-program product includes a computer-readable medium comprising instructions executable to transmit a control message to each of a plurality of apparatuses to receive simultaneous transmissions, receive an acknowledgement message from each of the apparatuses, wherein the acknowledgement messages were transmitted after receiving the control message at the apparatuses, and transmit, to the apparatuses in response to the acknowledgement messages, a backoff timing message with backoff values, wherein the backoff values indicate how long the apparatuses should wait after receiving the simultaneous transmissions before transmitting.

Certain aspects provide an access point. The access point generally includes at least one antenna, a transmitter configured to transmit via the at least one antenna a control message to each of a plurality of wireless nodes to receive simultaneous transmissions, and a receiver configured to receive via the at least one antenna an acknowledgement message from each of the wireless nodes, wherein the acknowledgement messages were transmitted after receiving the control message at the wireless nodes, wherein the transmitter is also configured to transmit, to the wireless nodes in response to the acknowledgement messages, a backoff timing message with backoff values, wherein the backoff values indicate how long the wireless nodes should wait after receiving the simultaneous transmissions before transmitting.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Figure 1:
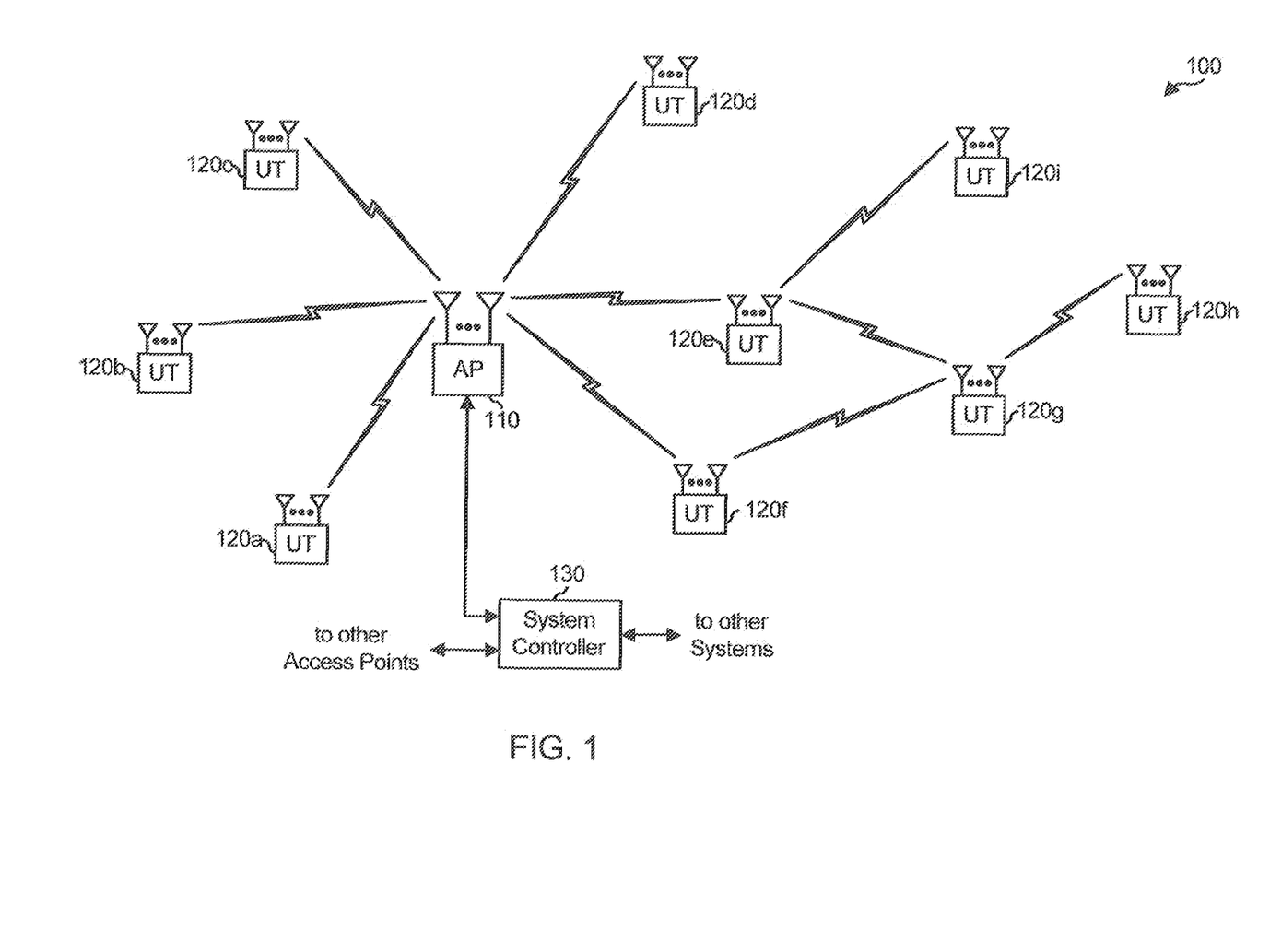
FIG. 1 illustrates a multiple-input multiple-output (MIMO) system with one access point and a plurality of multi-antenna user terminals in accordance with certain aspects of the present disclosure.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA) or Time Division Multiple Access (TDMA), for certain aspects, the user terminals 120 may also include some user terminals that do not support SDMA/TDMA. Thus, for such aspects, an AP 110 may be configured to communicate with both SDMA/TDMA and non-SDMA/TDMA user terminals. This approach may conveniently allow older versions of user terminals ("legacy" stations) to remain deployed in an enterprise, extending their useful lifetime, while allowing newer SDMA/TDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
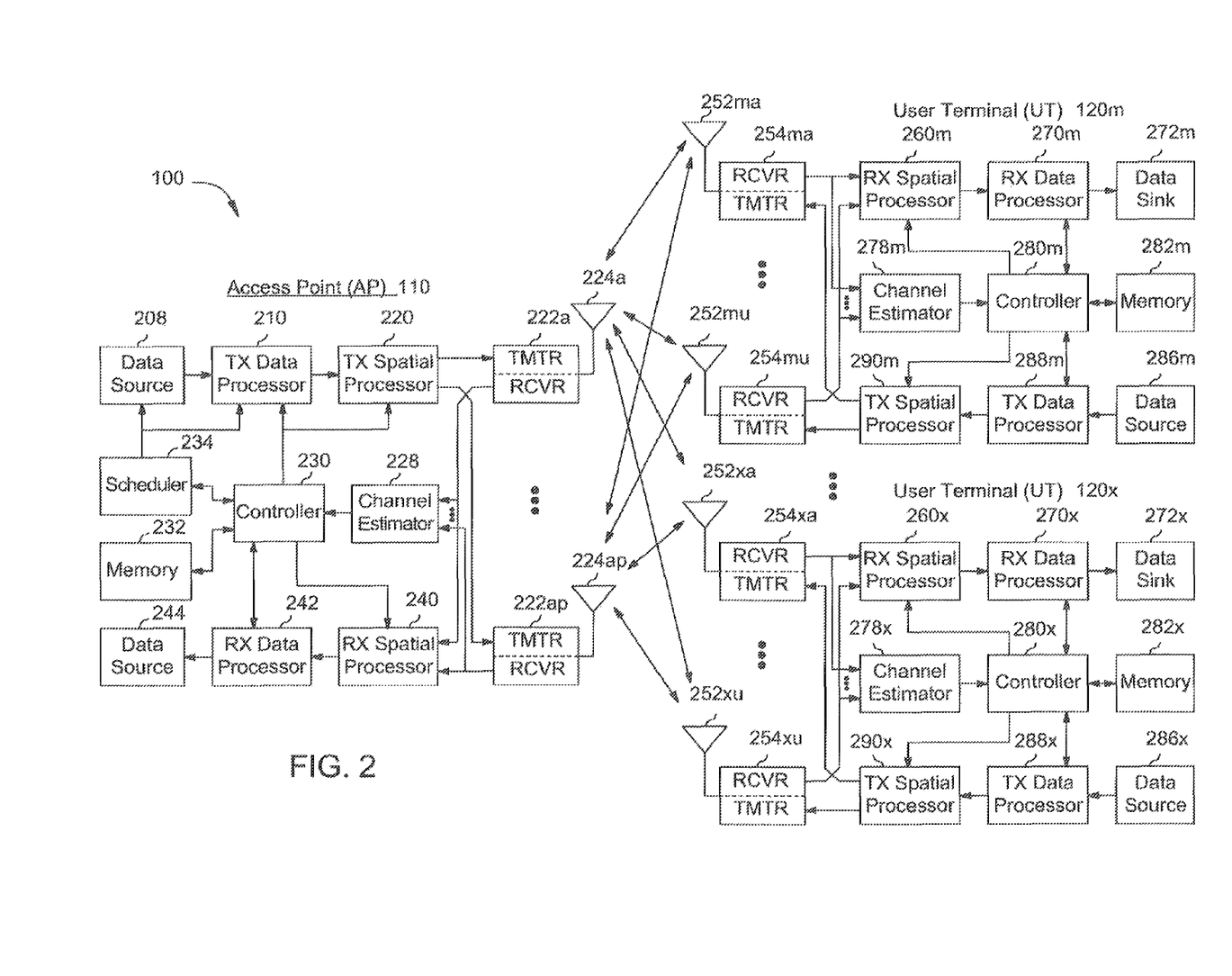
FIG. 2 illustrates a block diagram of an access point and a plurality of user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
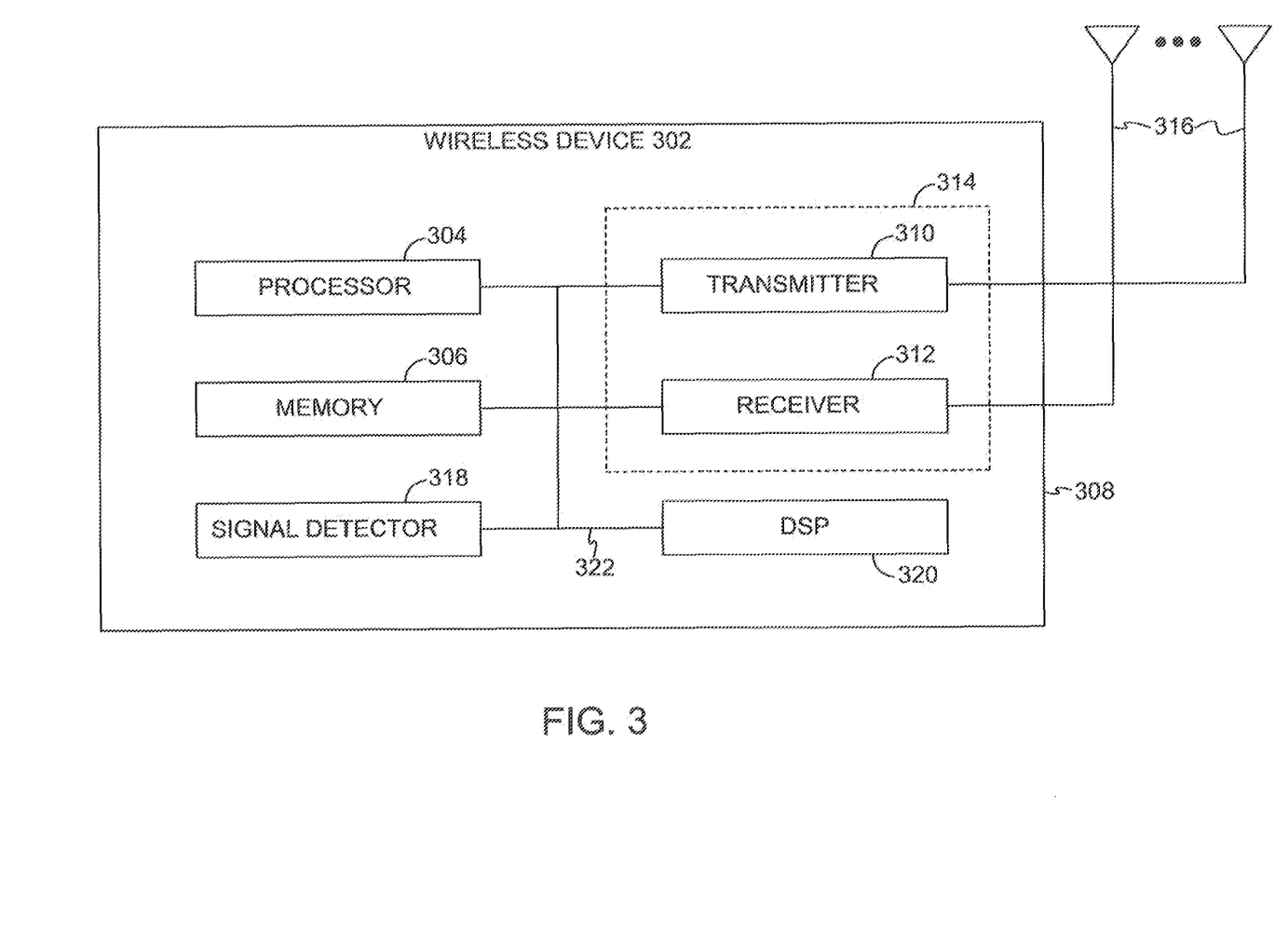
FIG. 3 illustrates various components that may be utilized in a wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be a base station 104 or a user terminal 106.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Following completion of downlink (DL) Transmission Control Protocol (TCP) transmissions from an access point (e.g., the access point 110 from FIG. 1) to a plurality of user stations (STAs) (e.g., the STAs 120 from FIG. 1) using either SDMA or TDMA technique, the STAs 120 may be required to send Transport Layer Acknowledgements (e.g., TCP ACKs) on the uplinks. However, the TCP ACKs may not be reflected in a buffer status sent by the STAs 120 prior to the DL SDMA/TDMA transmissions. If all the STAs 120 involved in the simultaneous DL transmissions choose individually their own backoff counts and begin post-backoff immediately after a Media Access Control (MAC) level acknowledgement (e.g., a block acknowledgement), then the probability of post-backoff collisions may be unacceptably high.

Figure 4:
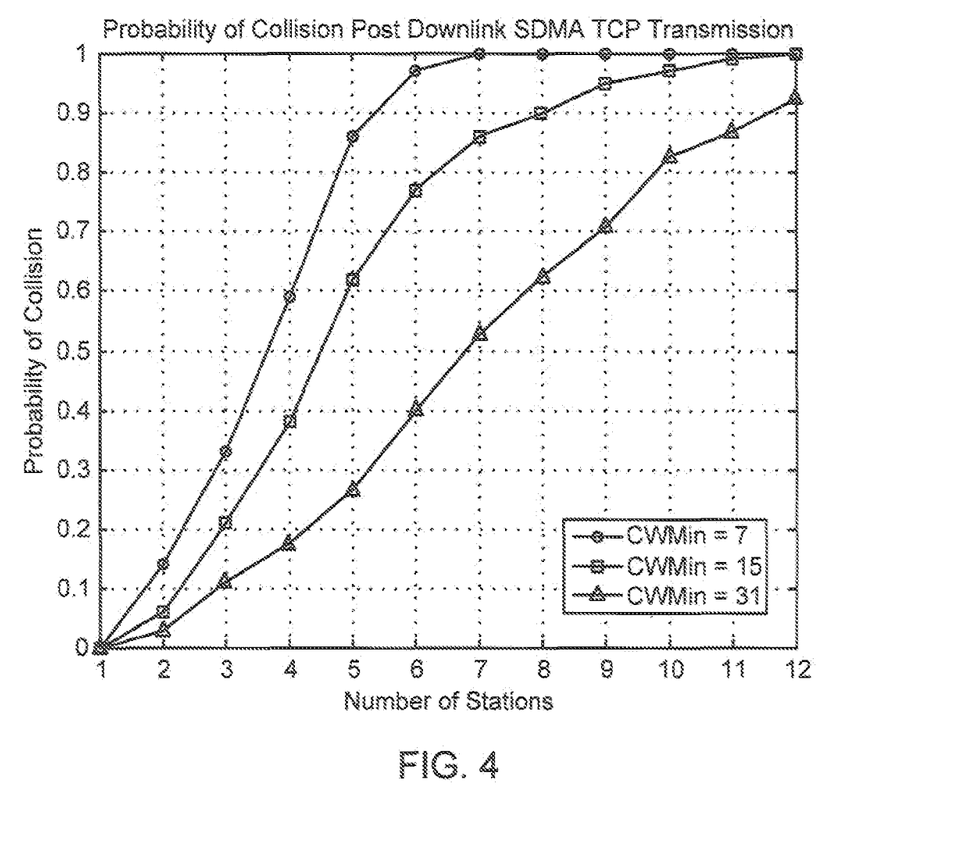
FIG. 4 illustrates a probability of post-backoff collisions versus a number of user stations (STAs) for different contention window sizes in accordance with certain aspects of the present disclosure.

FIG. 4 illustrates a probability of post-backoff uplink collisions as a function of a number of STAs receiving simultaneous downlink TCP transmissions for different minimum sizes of a contention window (CW) in accordance with certain aspects of the present disclosure. In the case of Access Category Voice (AC_VO) and Access Category Video (AC_VI) applications when the CW may be small, it may not be useful to allow more than four STAs to simultaneously go into post-backoff with same backoff parameters. In the case of Access Category Best Effort (AC_BE) and Access Category Back Ground (AC_BK) applications when the CW may be larger, it may not be useful to allow more than five STAs to simultaneously go into post-backoff with identical backoff parameters.

Solutions for Post-Backoff Collisions

An access point (AP), such as the AP 110 of the wireless system 100 illustrated in FIG. 1, may be able to determine that more than one signal flow exist in a downlink SDMA transmission having an upper layer acknowledgement. This information may be inferred by looking at Traffic Specification (TSPEC) or by performing an application layer packet inspection. The AP may also determine that there may be more than one signal flow for user STAs that receive simultaneous downlink SDMA transmissions. This information may be inferred by looking at a buffer status associated with each of these STAs.

In one aspect of the present disclosure, the AP may assign a back-off value to each STA, wherein the backoff value may indicate how long the STA should wait after receiving the downlink transmission before transmitting on an uplink. If a number of scheduled STAs for the simultaneous downlink transmissions is less than a defined minimum value for contention window (i.e., CWMin), then each scheduled STA may be assigned with a unique value from a randomly sorted array of numbers between one and CWMin. On the other hand, if the number of scheduled STAs is greater than the CWMin, then each STA may be assigned with a unique value from a randomly sorted array of numbers between one and a defined number larger than the number of scheduled STAs.

In another aspect of the present disclosure, the AP may send a "do not contend" downlink message to the STAs indicating that the STAs should not contend for a communication medium. Sending the "do not contend" message may comprise setting a particular bit in the simultaneous downlink transactions. Then, a Short Inter-Frame Space (SIFS) time duration after receiving a Block Acknowledgement (BA) from the STAs, the AP may send a Back-off Timing message to the STAs, wherein this message may comprise a unique back-off value for each of the STAs.

Figure 5:
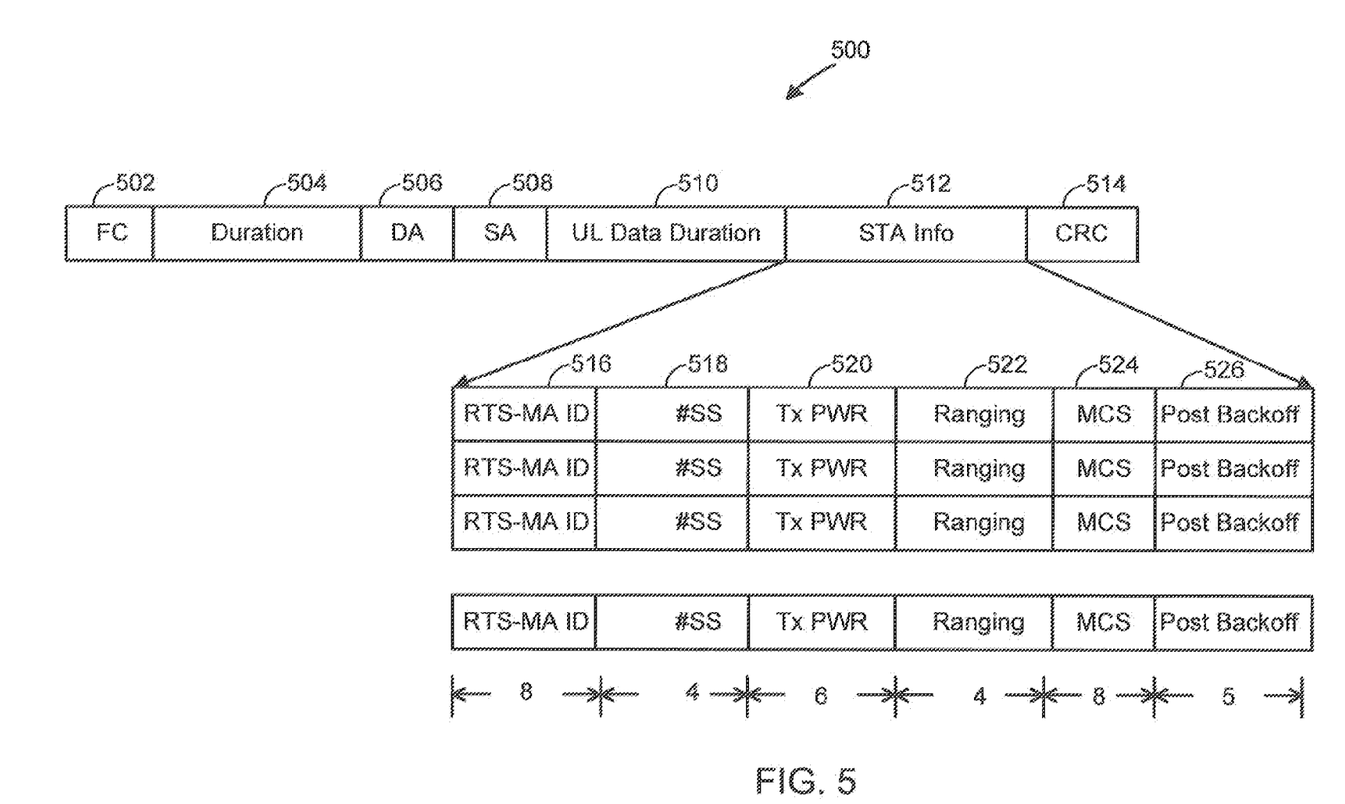
FIG. 5 illustrates an example format of a Request Message (RM) transmitted to the STAs in accordance with certain aspects of the present disclosure.

FIG. 5 illustrates an example format of a Request Message (RM) 500 for multiple access transmitted to the STAs in accordance with certain aspects of the present disclosure. The RM 500 may comprise: a Frame Control (FC) field 502, a Duration field 504, a Destination Address (DA) field 506, a Source Address (SA) field 508, an Uplink (UL) Data Duration field 510, a STA information field 512 and a Cyclic Redundancy Check (CRC) field 514. As illustrated in FIG. 5, for each of the STAs employed in the simultaneous downlink SDMA transmissions, the STA info field 512 may comprise: a Request to Send Multiple Access (RTS-MA) identification (ID) 516, information about a number of subscribers (#SS) 518 associated with each of the STAs, an indication about a transmission power (Tx PWR) 520, a ranging field 522, an indication about utilized modulation coding scheme (MCS) 524, and an assigned backoff value 526.

Figure 6:
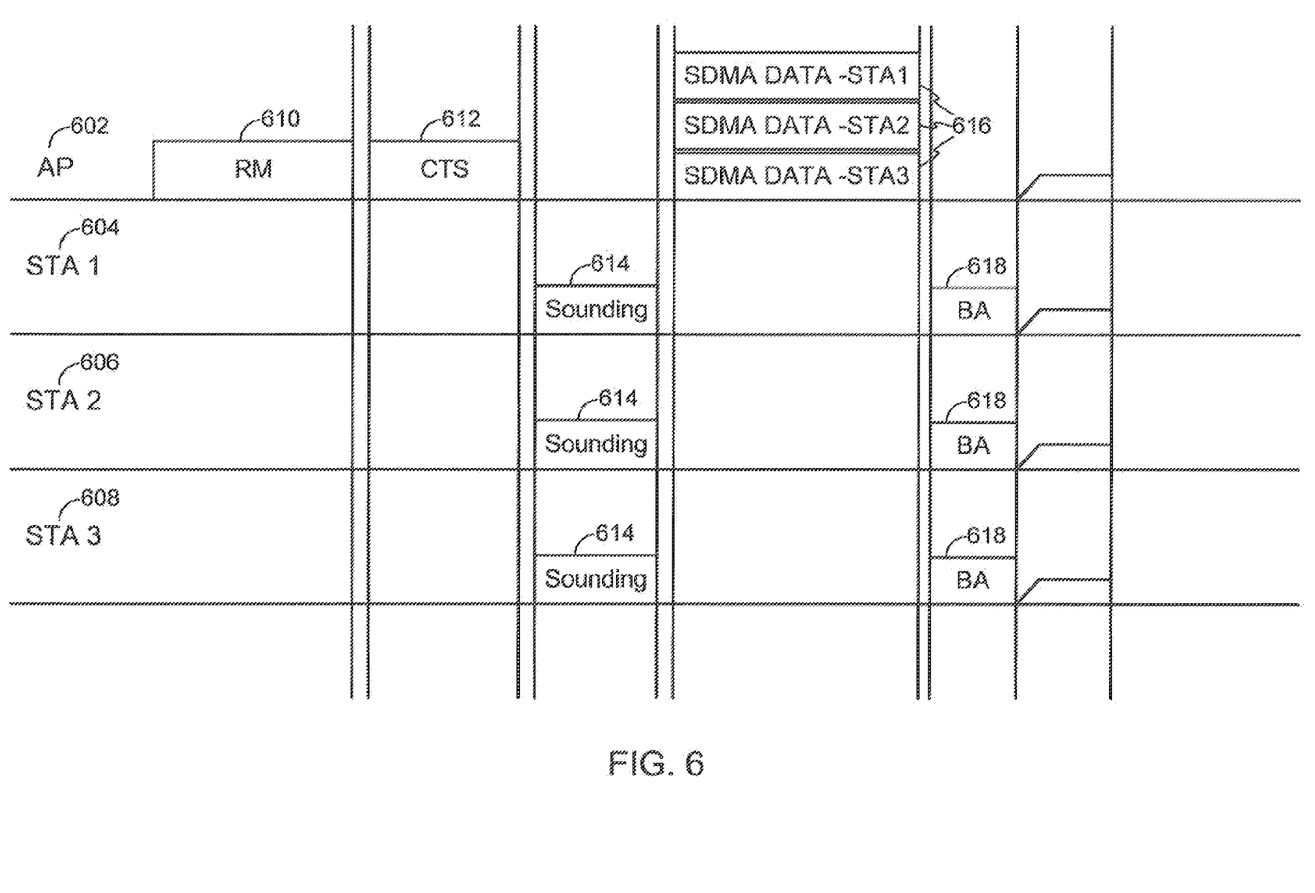
FIG. 6 illustrates an example communication between an access point (AP) and the STAs in accordance with certain aspects of the present disclosure.

FIG. 6 illustrates an example communication between an AP 602 and STAs 604-608 that receive simultaneous downlink transmissions in accordance with certain aspects of the present disclosure. An uplink data transmission time for each of the STAs 604-608 may be determined by a corresponding backoff time value provided within a Request Message (RM) 610, as illustrated in FIG. 5.

As illustrated in FIG. 6, the AP 602 may transmit the RM 610 comprising randomly chosen backoff times for each of the STAs 604-608, as well as a Clear-to-send (CTS) message 612 following transmission of the RM 610. The backoff times specified in the RM 610 may be utilized at the STAs 604-608 for sending uplink data following simultaneous downlink SDMA transactions. As illustrated in FIG. 6, the STAs 604-608 may respond to the reception of the RM 610 with sounding information 614. In response to the sounding information 614, the AP 602 may simultaneously transmit downlink SDMA transactions 616 to the STAs 604-608. After receiving the downlink SDMA transactions 616, the STAs 604-608 may send their respective Block Acknowledgements (BAs) 618, and then they may go into the post-backoff mode according to the random backoff times specified by the AP 602 in the RM 610. To confirm back to the AP 602 successful assignments of the backoff times at the STAs 604-608, each BA 618 may comprise the corresponding backoff time value assigned to that STA.

It should be also noted that if there is a STA listed in the RM 610 that did not receive the downlink SDMA transaction 616 (either because this particular STA did not send the sounding information or because the AP 602 did not receive the sounding information), then this particular STA may not need to obey the backoff times provided within the RM 610.

Figure 7:
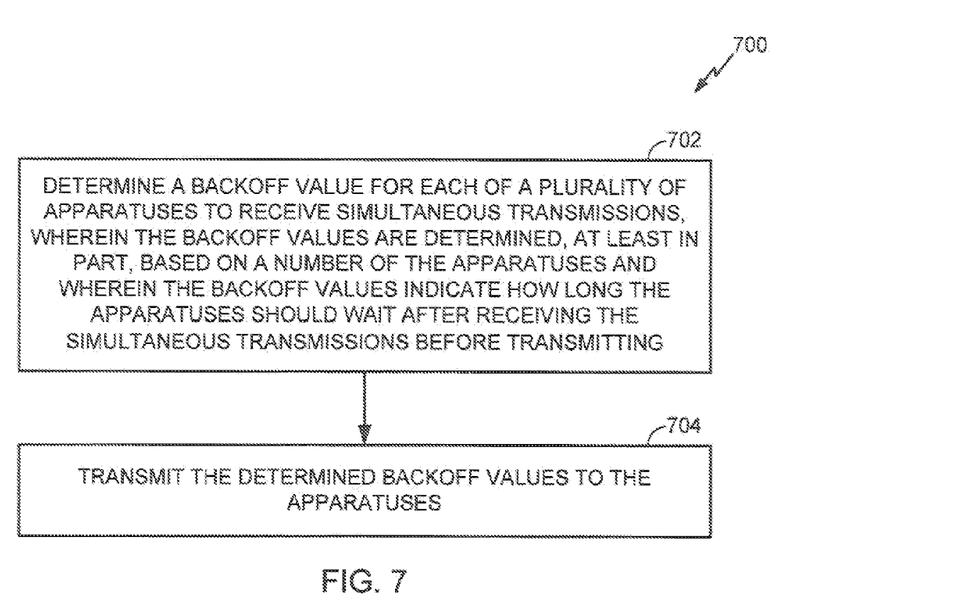
FIG. 7 illustrates example operations that may be executed at the AP to determine a backoff value for each of a plurality of STAs that receive simultaneous downlink transmissions in accordance with certain aspects of the present disclosure.

FIG. 7 illustrates example operations 700 that may be executed at an apparatus (e.g., at an access point) to determine a backoff value for each of a plurality of other apparatuses (e.g., wireless nodes) that may receive simultaneous transmissions in accordance with certain aspects of the present disclosure. At 702, the apparatus may determine a backoff value for each of the other apparatuses, wherein the backoff values may be determined, at least in part, based on a number of the other apparatuses and wherein the backoff values may indicate how long the other apparatuses should wait after receiving the simultaneous transmissions before transmitting. At 704, the apparatus may transmit the determined backoff values to the other apparatuses.

Figure 8:
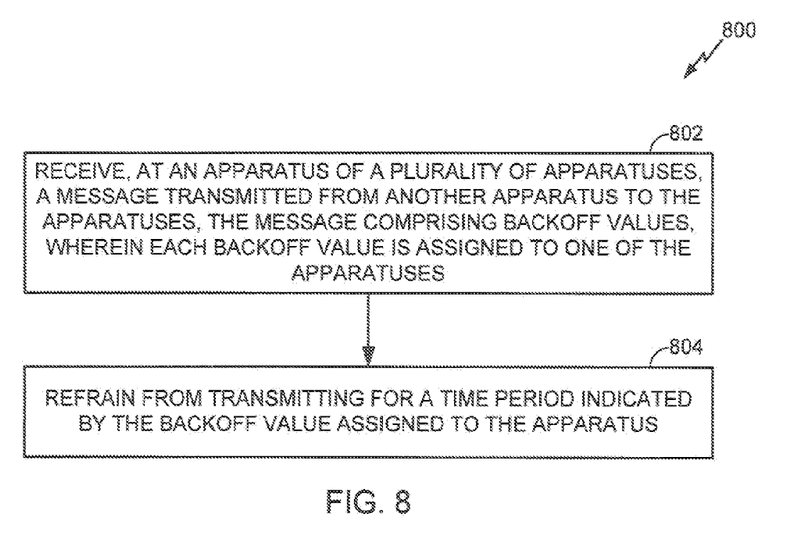
FIG. 8 illustrates example operations that may be executed at a STA of the plurality of STAs for refraining from an uplink transmission for a time period indicated by the backoff value in accordance with certain aspects of the present disclosure.

FIG. 8 illustrates example operations 800 that may be executed at an apparatus of a plurality of apparatuses (e.g., wireless nodes) that may receive simultaneous transmissions from another apparatus (e.g., an access point) in accordance with certain aspects of the present disclosure. At 802, the apparatus may receive a message transmitted from the other apparatus to the apparatuses, the message comprising backoff values, wherein each backoff value may be assigned to one of the apparatuses. At 804, the apparatus may refrain from transmitting for a time period indicated by the assigned backoff value.

Figure 9:
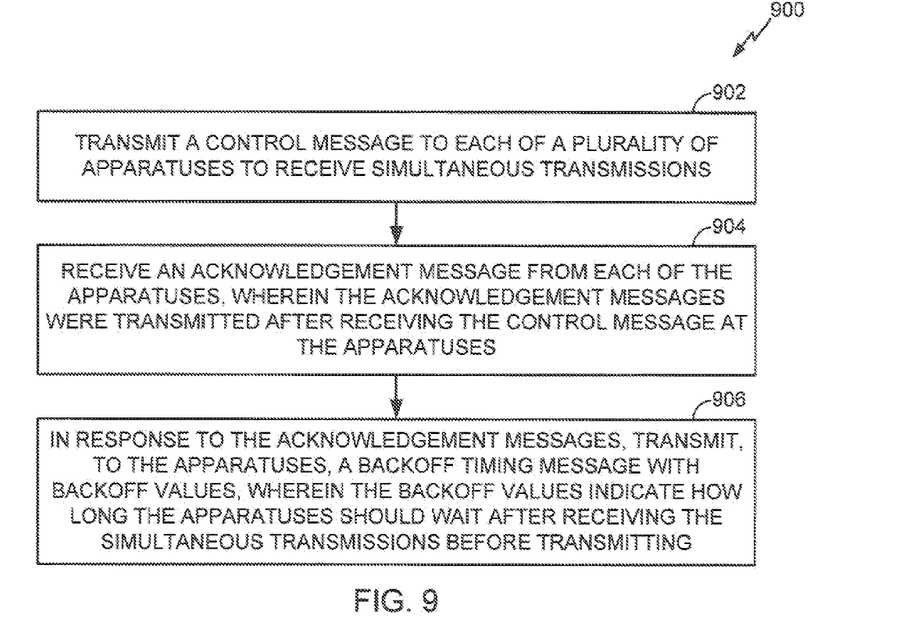
FIG. 9 illustrates other example operations that may be executed at the AP to determine a backoff value for each of the plurality of STAs that receive the simultaneous transmissions in accordance with certain aspects of the present disclosure.

FIG. 9 illustrates other example operations 900 that may be executed at an apparatus (e.g., at an access point) to determine a backoff value for each of a plurality of other apparatuses (e.g., wireless nodes) that may receive simultaneous transmissions in accordance with certain aspects of the present disclosure. At 902, the apparatus may transmit a control message to each of the other apparatuses. At 904, the apparatus may receive an acknowledgement message (i.e., a MAC level acknowledgement) from each of the other apparatuses, wherein the acknowledgement messages may be transmitted after receiving the control message at the other apparatuses. At 906, in response to the acknowledgement messages, the apparatus may transmit, to the other apparatuses, a backoff timing message with backoff values, wherein the backoff values may indicate how long the other apparatuses should wait after receiving the simultaneous transmissions before transmitting.

The post-backoff collisions in uplinks may also occur for other downlink multi-aggregate transmission mechanisms, such as the mechanism employing transmission of an Aggregate Physical Layer Protocol Data Unit (APPDU) to a plurality of STAs. In one aspect of the present disclosure, post backoff times may be provided to the STAs in one of header fields of the APPDU frame. In another aspect of the present disclosure, a "do not contend" message may be present (i.e., a corresponding bit may be set) in one of the header fields of the APPDU frame. Then, a post-backoff time message may be sent from an access point to the STAs, the message including the post-backoff times for all the STAs.

Figure 7A:
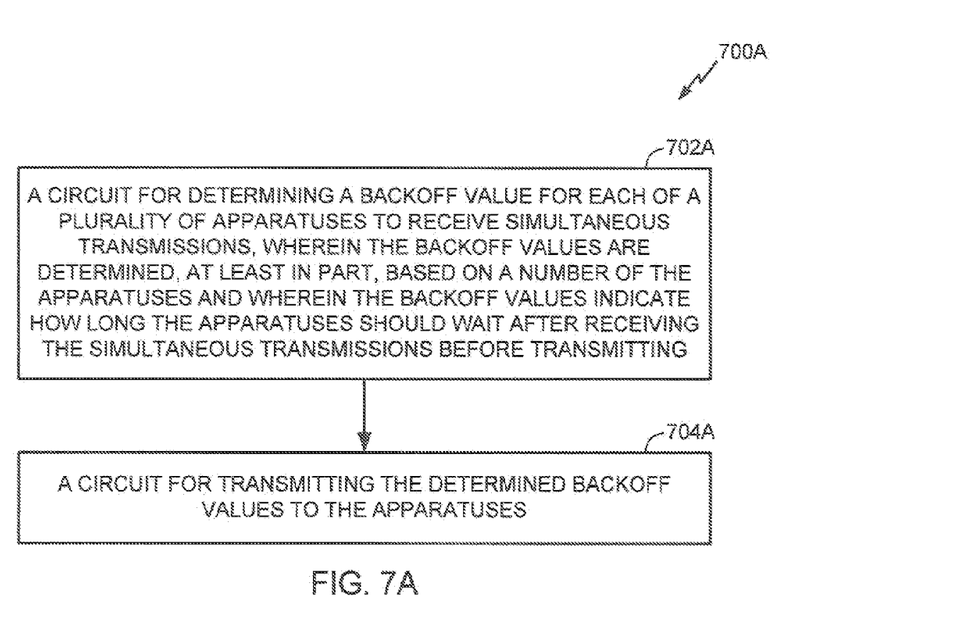
FIG. 7A illustrates example components capable of performing the operations illustrated in FIG. 7.
Figure 8A:
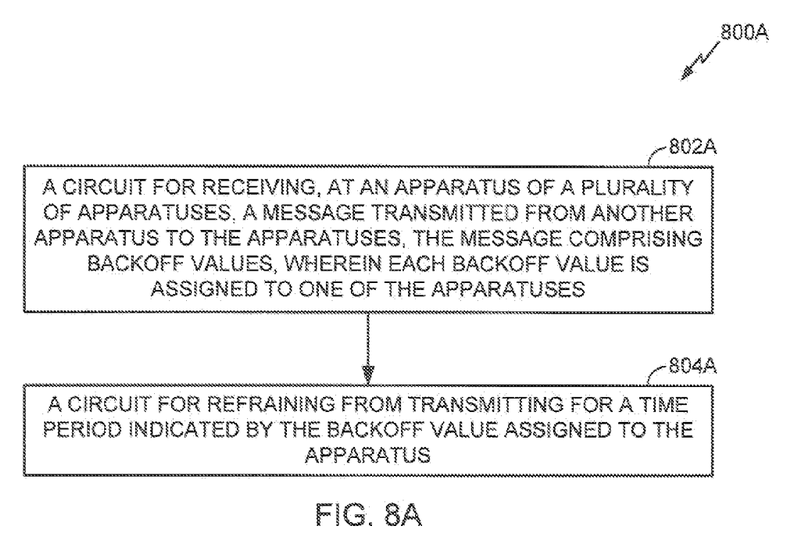
FIG. 8A illustrates example components capable of performing the operations illustrated in FIG. 8.
Figure 9A:
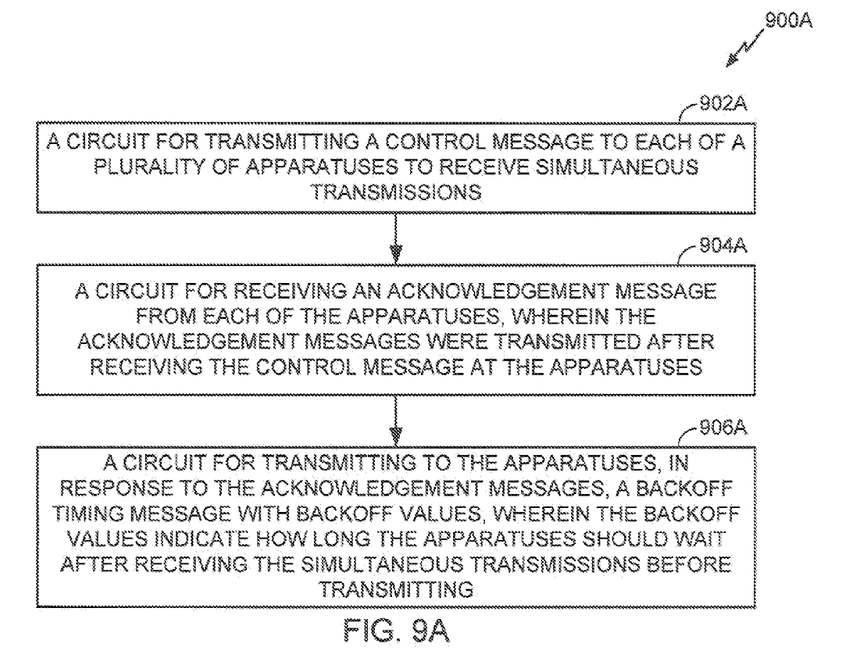
FIG. 9A illustrates example components capable of performing the operations illustrated in FIG. 9.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 700, 800 and 900, illustrated in FIGS. 7, 8 and 9 correspond to components 700A, 800A and 900A illustrated in FIGS. 7A, 8A and 9A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
   determining a backoff value for each of a plurality of apparatuses that are scheduled to receive simultaneous transmissions, wherein the backoff values are determined, at least in part, based on a number of the apparatuses and wherein the backoff values indicate how long the apparatuses should wait after receiving the simultaneous transmissions before transmitting;
   transmitting the determined backoff values to the apparatuses; and
   transmitting the simultaneous transmissions to the plurality of apparatuses after transmitting the backoff values.

2. The method of claim 1, wherein the backoff values indicate how long the apparatuses should wait after receiving the simultaneous transmissions before sending transport layer acknowledgements.

3. The method of claim 1, wherein determining the backoff value for each of the apparatuses comprises:
   assigning, to each of the apparatuses, a unique value from a randomly sorted array of numbers between one and a defined value, if the number of the apparatuses is smaller than the defined value.

4. The method of claim 3, wherein the defined value comprises a minimum contention window size.

5. The method of claim 1, wherein determining the backoff value for each of the apparatuses comprises:
   assigning, to each of the apparatuses, a unique value from a randomly sorted array of numbers between one and a first value greater than the number of the apparatuses, if the number of the apparatuses is greater than a second value.

6. The method of claim 5, wherein the second value comprises a minimum contention window size.

7. The method of claim 1, wherein the determined backoff values are transmitted in a message requesting access to the apparatuses.

8. The method of claim 1, wherein the determined backoff values are transmitted in one or more header fields of an Aggregate Physical Layer Protocol Data Unit (APPDU) frame.

9. An apparatus for wireless communications, comprising:
   a processing system configured to determine a backoff value for each of a plurality of apparatuses that are scheduled to receive simultaneous transmissions, wherein the backoff values are determined, at least in part, based on a number of the apparatuses and wherein the backoff values indicate how long the apparatuses should wait after receiving the simultaneous transmissions before transmitting; and
   a transmitter configured to transmit the determined backoff values to the apparatuses and to transmit the simultaneous transmissions to the plurality of apparatuses after transmission of the backoff values.

10. The apparatus of claim 9, wherein the backoff values indicate how long the apparatuses should wait after receiving the simultaneous transmissions before sending transport layer acknowledgements.

11. The apparatus of claim 9, wherein the processing system configured to determine the backoff value for each of the apparatuses comprises:
    a circuit configured to assign, to each of the apparatuses, a unique value from a randomly sorted array of numbers between one and a defined value, if the number of the apparatuses is smaller than the defined value.

12. The apparatus of claim 11, wherein the defined value comprises a minimum contention window size.

13. The apparatus of claim 9, wherein the processing system configured to determine the backoff value for each of the apparatuses comprises:
    a circuit configured to assign, to each of the apparatuses, a unique value from a randomly sorted array of numbers between one and a first value greater than the number of the apparatuses, if the number of the apparatuses is greater than a second value.

14. The apparatus of claim 13, wherein the second value comprises a minimum contention window size.

15. The apparatus of claim 9, wherein the determined backoff values are transmitted in a message requesting access to the apparatuses.

16. The apparatus of claim 9, wherein the determined backoff values are transmitted in one or more header fields of an Aggregate Physical Layer Protocol Data Unit (APPDU) frame.

17. An apparatus for wireless communications, comprising:
    means for determining a backoff value for each of a plurality of apparatuses that are scheduled to receive simultaneous transmissions, wherein the backoff values are determined, at least in part, based on a number of the apparatuses and wherein the backoff values indicate how long the apparatuses should wait after receiving the simultaneous transmissions before transmitting;

means for transmitting the determined backoff values to the apparatuses; and means for transmitting the simultaneous transmissions to the plurality of apparatuses after transmission of the backoff values.

18. The apparatus of claim 17, wherein the backoff values indicate how long the apparatuses should wait after receiving the simultaneous transmissions before sending transport layer acknowledgements.

19. The apparatus of claim 17, wherein the means for determining the backoff value for each of the apparatuses comprises:

means for assigning, to each of the apparatuses, a unique value from a randomly sorted array of numbers between one and a defined value, if the number of the apparatuses is smaller than the defined value.

20. The apparatus of claim 19, wherein the defined value comprises a minimum contention window size.

21. The apparatus of claim 17, wherein the means for determining the backoff value for each of the apparatuses comprises:

means for assigning, to each of the apparatuses, a unique value from a randomly sorted array of numbers between one and a first value greater than the number of the apparatuses, if the number of the apparatuses is greater than a second value.

22. The apparatus of claim 21, wherein the second value comprises a minimum contention window size.

23. The apparatus of claim 17, wherein the determined backoff values are transmitted in a message requesting access to the apparatuses.

24. The apparatus of claim 17, wherein the determined backoff values are transmitted in one or more header fields of an Aggregate Physical Layer Protocol Data Unit (APPDU) frame.

25. A computer-program product for wireless communications, comprising a computer-readable storage device comprising instructions executable to:

determine a backoff value for each of a plurality of apparatuses that are scheduled to receive simultaneous transmissions, wherein the backoff values are determined, at least in part, based on a number of the apparatuses and wherein the backoff values indicate how long the apparatuses should wait after receiving the simultaneous transmissions before transmitting;

transmit the determined backoff values to the apparatuses; and transmit the simultaneous transmissions to the plurality of apparatuses after transmission of the backoff values.

26. An access point, comprising:

at least one antenna;

a processing system configured to determine a backoff value for each of a plurality of wireless nodes that are scheduled to receive simultaneous transmissions, wherein the backoff values are determined, at least in part, based on a number of the wireless nodes and wherein the backoff values indicate how long the wireless nodes should wait after receiving the simultaneous transmissions before transmitting; and a transmitter configured to transmit via the at least one antenna the determined backoff values to the wireless nodes and to transmit the simultaneous transmissions to the plurality of wireless nodes after transmission of the backoff values.

27. A method for wireless communications, comprising:

receiving, at an apparatus of a plurality of apparatuses, a message transmitted from another apparatus to the apparatuses, the message comprising backoff values, wherein each backoff value is assigned to one of the apparatuses;

receiving data from the other apparatus;

in response to the received data, transmitting an acknowledgement to the other apparatus; and refraining from transmitting after transmission of the acknowledgment for a time period indicated by the backoff value assigned to the apparatus.

28. The method of claim 27, further comprising:

transmitting a transport layer acknowledgement to the other apparatus after the time period indicated by the assigned backoff value has been elapsed.

29. The method of claim 27, further comprising, in response to the message, transmitting sounding information to the other apparatus, wherein the data were transmitted in response to the sounding information received at the other apparatus.

30. The method of claim 29, wherein the acknowledgement is a MAC level acknowledgement.

31. The method of claim 30, wherein the MAC level acknowledgement comprises a block acknowledgement.

32. The method of claim 31, wherein the block acknowledgement comprises the assigned backoff value.

33. The method of claim 27, wherein the message comprises a Request Message (RM) for accessing the apparatuses.

34. The method of claim 27, wherein the message comprises an Aggregate Physical Layer Protocol Data Unit (APPDU) message.

35. The method of claim 34, wherein a header field of the APPDU message comprises the assigned backoff values.

36. The method of claim 27, wherein each assigned backoff value is unique.

37. An apparatus for wireless communications, comprising:

a receiver configured to receive, at the apparatus of a plurality of apparatuses, a message transmitted from another apparatus to the apparatuses, the message comprising backoff values, wherein each backoff value is assigned to one of the apparatuses, and further configured to receive data from the other apparatus; and a transmitter configured to transmit, in response to the received data, an acknowledgment to the other apparatus and to refrain from transmitting after transmission of the acknowledgement for a time period indicated by the backoff value assigned to the apparatus.

38. The apparatus of claim 37, wherein the transmitter is also configured to transmit a transport layer acknowledgement to the other apparatus after the time period indicated by the assigned backoff value has been elapsed.

39. The apparatus of claim 37, wherein the transmitter is also configured to transmit, in response to the message, sounding information to the other apparatus, and the data were transmitted in response to the sounding information received at the other apparatus.

40. The apparatus of claim 39, wherein the acknowledgment is a MAC level acknowledgement.

41. The apparatus of claim 40, wherein the MAC level acknowledgement comprises a block acknowledgement.

42. The apparatus of claim 41, wherein the block acknowledgement comprises the assigned backoff value.

43. The apparatus of claim 37, wherein the message comprises a Request Message (RM) for accessing the apparatuses.

44. The apparatus of claim 37, wherein the message comprises an Aggregate Physical Layer Protocol Data Unit (APPDU) message.

45. The apparatus of claim 44, wherein a header field of the APPDU message comprises the assigned backoff values.

46. The apparatus of claim 37, wherein each assigned backoff value is unique.

47. An apparatus for wireless communications, comprising:
   means for receiving, at the apparatus of a plurality of apparatuses, a message transmitted from another apparatus to the apparatuses, the message comprising backoff values, wherein each backoff value is assigned to one of the apparatuses;
   means for receiving data from the other apparatus;
   means for transmitting, in response to the received data, an acknowledgement to the other apparatus; and
   means for refraining from transmitting after transmission of the acknowledgement for a time period indicated by the backoff value assigned to the apparatus.

48. The apparatus of claim 47, further comprising:
   means for transmitting a transport layer acknowledgement to the other apparatus after the time period indicated by the assigned backoff value has been elapsed.

49. The apparatus of claim 47, further comprising
   means for transmitting, in response to the message, sounding information to the other apparatus, wherein
   the data were transmitted in response to the sounding information received at the other apparatus.

50. The apparatus of claim 49,
   the acknowledgment is a MAC level acknowledgement.

51. The apparatus of claim 50, wherein the MAC level acknowledgement comprises a block acknowledgement.

52. The apparatus of claim 51, wherein the block acknowledgement comprises the assigned backoff value.

53. The apparatus of claim 47, wherein the message comprises a Request Message (RM) for accessing the apparatuses.

54. The apparatus of claim 47, wherein the message comprises an Aggregate Physical Layer Protocol Data Unit (APPDU) message.

55. The apparatus of claim 54, wherein a header field of the APPDU message comprises the assigned backoff values.

56. The apparatus of claim 47, wherein each assigned backoff value is unique.

57. A computer-program product for wireless communications, comprising a computer-readable storage device comprising instructions executable to:
   receive, at an apparatus of a plurality of apparatuses, a message transmitted from another apparatus to the apparatuses, the message comprising backoff values, wherein each backoff value is assigned to one of the apparatuses;
   receive data from the other apparatus;
   transmit, in response to the received data, an acknowledgement to the other apparatus; and
   refrain from transmitting after transmission of the acknowledgement for a time period indicated by the backoff value assigned to the apparatus.

58. A wireless node, comprising:
   at least one antenna;
   a receiver configured to receive via the at least one antenna, at the wireless node of a plurality of wireless nodes, a message transmitted from an access point to the wireless nodes, the message comprising backoff values, wherein each backoff value is assigned to one of the wireless nodes, and further configured to receive data from the other apparatus; and
   a transmitter configured to transmit, in response to the received data, an acknowledgment to the other apparatus and to refrain from transmitting after transmission of the acknowledgement for a time period indicated by the backoff value assigned to the apparatus.

59. A method for wireless communications, comprising:
   transmitting a control message to each of a plurality of apparatuses that are scheduled to receive simultaneous transmissions;
   receiving an acknowledgement message from each of the apparatuses, wherein the acknowledgement messages were transmitted after receiving the control message at the apparatuses; and
   in response to the acknowledgement messages, transmitting, to the apparatuses, a backoff timing message with backoff values, wherein the backoff values indicate how long the apparatuses should wait after receiving the simultaneous transmissions before transmitting.

60. The method of claim 59, wherein the backoff timing message is transmitted a Short Inter-Frame Space (SIFS) time duration after the reception of the acknowledgement messages.

61. The method of claim 59, wherein transmitting the control message comprises:
   transmitting the control message in each of the simultaneous transmissions.

62. The method of claim 59, wherein the control message comprises an indication that the apparatuses should not contend for a communication medium.

63. The method of claim 59, wherein the control message is transmitted in a header field of an Aggregate Physical Layer Protocol Data Unit (APPDU).

64. The method of claim 59, wherein the acknowledgement messages comprise Media Access Control (MAC) level acknowledgements.

65. The method of claim 59, wherein all the backoff values are different.

66. An apparatus for wireless communications, comprising:
   a transmitter configured to transmit a control message to each of a plurality of apparatuses that are scheduled to receive simultaneous transmissions; and
   a receiver configured to receive an acknowledgement message from each of the apparatuses, wherein the acknowledgement messages were transmitted after receiving the control message at the apparatuses, wherein
   the transmitter is also configured to transmit, to the apparatuses in response to the acknowledgement messages, a backoff timing message with backoff values, wherein the backoff values indicate how long the apparatuses should wait after receiving the simultaneous transmissions before transmitting.

67. The apparatus of claim 66, wherein the backoff timing message is transmitted a Short Inter-Frame Space (SIFS) time duration after the reception of the acknowledgement messages.

68. The apparatus of claim 66, wherein the transmitter is also configured to transmit the control message in each of the simultaneous transmissions.

69. The apparatus of claim 66, wherein the control message comprises an indication that the apparatuses should not contend for a communication medium.

70. The apparatus of claim 66, wherein the control message is transmitted in a header field of an Aggregate Physical Layer Protocol Data Unit (APPDU).

71. The apparatus of claim 66, wherein the acknowledgement messages comprise Media Access Control (MAC) level acknowledgements.

72. The apparatus of claim 66, wherein all the backoff values are different.

73. An apparatus for wireless communications, comprising:
- means for transmitting a control message to each of a plurality of apparatuses that are scheduled to receive simultaneous transmissions; and
- means for receiving an acknowledgement message from each of the apparatuses, wherein the acknowledgement messages were transmitted after receiving the control message at the apparatuses, wherein
- the means for transmitting is further configured to transmit, to the apparatuses in response to the acknowledgement messages, a backoff timing message with backoff values, wherein the backoff values indicate how long the apparatuses should wait after receiving the simultaneous transmissions before transmitting.

74. The apparatus of claim 73, wherein the backoff timing message is transmitted a Short Inter-Frame Space (SIFS) time duration after the reception of the acknowledgement messages.

75. The apparatus of claim 73, wherein the means for transmitting is further configured to transmit the control message in each of the simultaneous transmissions.

76. The apparatus of claim 73, wherein the control message comprises an indication that the apparatuses should not contend for a communication medium.

77. The apparatus of claim 73, wherein the control message is transmitted in a header field of an Aggregate Physical Layer Protocol Data Unit (APPDU).

78. The apparatus of claim 73, wherein the acknowledgement messages comprise Media Access Control (MAC) level acknowledgements.

79. The apparatus of claim 73, wherein all the backoff values are different.

80. A computer-program product for wireless communications, comprising a computer-readable storage device comprising instructions executable to:
- transmit a control message to each of a plurality of apparatuses that are scheduled to receive simultaneous transmissions;
- receive an acknowledgement message from each of the apparatuses, wherein the acknowledgement messages were transmitted after receiving the control message at the apparatuses; and
- transmit, to the apparatuses in response to the acknowledgement messages, a backoff timing message with backoff values, wherein the backoff values indicate how long the apparatuses should wait after receiving the simultaneous transmissions before transmitting.

81. An access point, comprising:
- at least one antenna;
- a transmitter configured to transmit via the at least one antenna a control message to each of a plurality of wireless nodes that are scheduled to receive simultaneous transmissions; and
- a receiver configured to receive via the at least one antenna an acknowledgement message from each of the wireless nodes, wherein the acknowledgement messages were transmitted after receiving the control message at the wireless nodes, wherein
- the transmitter is also configured to transmit, to the wireless nodes in response to the acknowledgement messages, a backoff timing message with backoff values, wherein the backoff values indicate how long the wireless nodes should wait after receiving the simultaneous transmissions before transmitting.

82. The method of claim 1, further comprising receiving sounding information from the plurality of apparatuses in response to the backoff values, wherein the simultaneous transmissions are transmitted in response to the sounding information.

83. The method of claim 1, wherein the backoff values are transmitted in a message requesting access to the apparatuses, and the method further comprises receiving a Clear-to-Send (CTS) message in response to the message requesting access to the apparatuses, wherein the simultaneous transmissions are transmitted after receiving the CTS message.

* * * * *